United States Patent [19]

McNab

[11] Patent Number: 4,910,971
[45] Date of Patent: Mar. 27, 1990

[54] INDIRECT AIR CONDITIONING SYSTEM
[75] Inventor: John L. McNab, Myrtle Bank, Australia
[73] Assignee: Hydro Thermal Engineering Pty. Ltd., Marleston, Australia
[21] Appl. No.: 304,070
[22] Filed: Jan. 30, 1989
[30] Foreign Application Priority Data
Aug. 16, 1988 [AU] Australia ................... PI6609
[51] Int. Cl.[4] .............................. F28D 5/00
[52] U.S. Cl. .......................... 62/310; 62/314
[58] Field of Search .................. 62/309, 310, 314
[56] References Cited

U.S. PATENT DOCUMENTS 3,964,268  6/1976  DiPeri .................. 62/314 X
4,023,949  5/1977  Schlom et al. ............ 62/310 X
4,156,351  5/1979  Schlom et al. ............ 62/310 X

FOREIGN PATENT DOCUMENTS 425702  9/1969  Australia .

Primary Examiner—Lloyd L. King
Attorney, Agent, or Firm—Klauber & Jackson

[57] ABSTRACT

This invention relates to an air conditioning system which utilizes the exhaust air from a conditioned space for the conditioning of the supply air to the conditioned space. The invention comprises a supply air heat exchanger and an exhaust air heat exchanger, where the supply air heat exchanger comprises an air-to-air type exchanger. The exhaust air is conditioned by the exhaust air heat exchanger, which may comprise heating or cooling of the exhaust air using dehumidification or evaporative cooling, for example. The conditioned exhaust air is then passed through the supply air heat exchanger so as to condition the supply air. One advantage of the invention is the indirect heat transfer from the exhaust air to the supply air, where any processes that may effect the quality of the exhaust air is not transferred to the supply air, since all or a majority of the exhaust air is discharged to atmosphere.

19 Claims, 11 Drawing Sheets 4,910,971

INDIRECT AIR CONDITIONING SYSTEM

This invention relates to an improved means and method of performing air conditioning processes of heating, cooling and dehumidifying air which is supplied into a conditioned space, for example within a building, to achieve desired conditions of temperature and humidity within that space.

BACKGROUND OF THE INVENTION

Air conditioning is widely used, but is subject to a number of disabilities in general.

Most air conditioning units which are in use employ vapour compression equipment with chlorofluorocarbon refrigerants, and these refrigerants sometimes leak into the atmosphere, and have a deleterious effect on the ozone layer. This matter is regarded as extremely serious and steps are being taken to limit use of CFC refrigerants.

When vapour compression systems are used, a great deal of energy is required to condition a space with sufficient control to achieve a condition of temperature and humidity within a so called "comfort zone" when the ambience is likely to change within wide ranges of temperature and humidity. In order to reduce energy consumption, it is common practice to recycle some of the air from the conditioned space, and in some instances as much as 85% of that air is recycled.

One of the difficulties which has been identified with recycled conditioned air is contamination. Not only do common germs spread throughout a building, but also dangerous chemical contamination such as formaldehyde and radon.

One of the objects of this invention therefore is to provide an air conditioning system that utilizes exhaust air, which is air that is moved from a conditioned space, to condition the supply air that is incoming to the conditioned space. This conditioning of the exhaust air, and heat transfer to the supply air is hereinafter referred to as "indirect air conditioning".

Another object of the invention is to provide a system which utilizes dehumidification of the exhaust air prior to the indirect conditioning of the supply air.

It is a still further object of this invention to provide a system which can be powered with the use of very much less electrical energy than is presently used in standard vapour compression refrigeration systems.

These objects are achieved by utilising indirect cooling or heating which employs heat exchangers that condition the exhaust air from a conditioned space, such that there is heat exchange between the exhaust air and the supply air. This exhaust air is eventually discharged to atmosphere, although in some instances recycling of some of the exhaust air may be possible.

Referring to the prior art, the closest reference to the present invention is disclosed in Australian Pat. No. 425702 in the name of the Commonwealth Scientific and Industrial Research Organization (inventor Donald Pescod), wherein a plate type heat exchanger having primary and secondary air flow passages therethrough is described. In particular a process of indirect cooling wherein water is introduced into the exhaust air within the plate type heat exchanger is described. The cooling of the exhaust air occurs only within the plate type heat exchanger wherein water is introduced within the secondary air flow passages through which the exhaust air travels. The cooling effect achieved is as a result of evaporation of the water by the exhaust air, thereby reducing the air temperature by transferring latent heat in the vaporization of the water.

However, the heat exchange in the abovementioned Australian Patent is only useful in dry and arid climates. Such a system has less applicability in more humid climates as the evaporative cooling process is less effective. Obviously, it would be necessary for dehumidification of the exhaust airstream for the heat exchanger in the abovementioned Australian Patent Application to be effective. Furthermore, this specification does not contemplate heating the air other than by simple heat recovery, and for an air conditioner to be useful, it must be provided with an effective heating mode.

The likely efficiency of an indirect air conditioning system is related to the heat transfer coefficient of the various heat exchangers, and with heat exchangers of the type suggested in the above-mentioned Australian specification, the heat transfer coefficient is likely to be in excess of 80%. In addition, research has found that in many applications an exhaust air quantity of about 80% of the air which enters the conditioned space is needed for that performance to be achieved in cooling, the remainder being air spillage to atmosphere. If, therefore, the air which is processed is exhaust air from the conditioned space, then there is an overall efficiency gain when compared with the presently used traditional vapour compression type systems. There are also further gains in efficiency in this invention in that in the heating mode the outdoor temperature at which a defrost cycle is needed is typically 7° C. below that needed in a traditional reverse cycle air conditioner. A defrost cycle can in many instance comprise a traditional reverse cycle wherein the cooling coil is actually heated, and this is obviously very wasteful of energy.

Vapour compression equipment and direct evaporation equipment as presently used both require power for fans and offer considerable resistance to the supply air flow, and in the latter case, require large duct work to reduce the losses. However, by utilising the proposed indirect air conditioning system of this invention, the duct work can be reduced in size and the fan requirements can also be reduced.

Reference is also made to U.S. Pat. No. 4771611 (invented by the Applicant herein) which is a "hybrid" of evaporative and vapour compression air conditioning, in which only the supply air was conditioned or processed. In this invention, only the exhaust air is operated upon by the system, as the exhaust air after being conditioned is used to in turn condition the supply air.

When an air conditioner operates in a heating mode, by utilising an indirect air conditioning system and processing the exhaust air use can be made of waste heat, preheated air, directly heated air, and either a condenser of a vapour compression type of plant (if used) or, advantageously, the heat available from dehumidification of the exhaust airstream. This therefore avoids mixing contaminated or stale exhaust air with the fresh air supply while exchanging heat between the two air flows. Likewise in a cooling mode, stale exhaust air which may well have been further contaminated in a desiccant type dehumidifier is unable to be mixed with a fresh supply air which is in turn introduced into a conditioned space.

BRIEF SUMMARY OF THE INVENTION

Briefly in this invention, an indirect air conditioner utilizes exhaust air from a conditioned space to condition supply air incoming to said space and has a supply air heat exchanger having primary air passages and secondary air passages extending therethrough for heat exchange between said primary and secondary air passages, means defining an intake air flow path between the downstream side of the primary air passages of the supply air heat exchanger and the conditioned space, an exhaust air heat exchanger, further means defining an exhaust air flow path between the conditioned space, the exhaust air heat exchanger, and the secondary air passages of said supply air heat exchanger, and air flow imparting means for effecting supply air flow through the primary air passages of the supply air heat exchanger and into the conditioned space and effecting exhaust air flow from the conditioned space, through the exhaust air heat exchanger, then through the secondary air passages of the supply air heat exchanger before being discharged to atmosphere.

The reference to an exhaust air heat exchanger is to include not only heat exchangers of the type where heat is added or subtracted to or from the exhaust air, but should also include adiabatic-type processes such as desiccant dehumidifiers where although no energy is transferred to or from the exhaust air flow, the effect of removing water from the air flow is to increase the dry bulb temperature of the exhaust air. Therefore, reference to the exhaust air heat exchanger is to include all processes where the exiting dry bulb temperature of the exhaust airstream is changed.

In accordance with the broadest form of the invention, the indirect air conditioner may be used to either solely cool or heat a conditioned pace, or there may be provided a system which is capable of both heating and cooling as may be required.

Advantageously, the exhaust air heat exchanger comprises a dehumidifier in which the absolute humidity of the exhaust airstream is reduced. Persons skilled in the art will recognize that reference to absolute humidity mean reduction of actual moisture content within the particular airstream. Obviously, the absolute humidity may decrease although the relative humidity of the airstream is increasing due to temperature decrease.

Therefore, this dehumidification of the airstream can be achieved either by removal of moisture from the air using a desiccator, or removal of water from the air by passing it through a cooling coil which in addition to cooling the airstream will reduce the moisture content of the air.

When the exhaust air heat exchanger comprises a desiccator, cooling can be obtained by making use of indirect evaporative cooling where the dried air exiting from the desiccator is introduced into water spray or other evaporative cooling means. Alternatively, or in addition, the exhaust air may be cooled as it passes through the desiccator. In the heating mode, the air only needs to pass through the desiccator for the drop of temperature to increase.

The desiccator may comprise either a liquid desiccant such as lithium bromide or lithium chloride, or may comprise a rotary desiccant dehumidifier using a solid desiccant. In both systems, use may be made of further heat exchangers within the air conditioning system which utilize waste heat or exhaust air so as to dry the desiccant that has been used.

Desiccators are generally safe for use within air conditioning systems, although lithium chloride for example is known to cause certain illnesses after prolonged exposure. Also, desiccants are known to absorb toxic materials as well as water and to desorb them into the circulating air. However, by utilising the indirect conditioning system, even this hazard is avoided since it is only the exhaust air which is being processed, the majority of which is discharged into atmosphere.

In a further example of the invention the exhaust air heat exchanger may comprise an evaporator coil of the conventional vapour compression refrigeration circuit, and preferably the exhaust air is further cooled by introducing water into the airstream. This may occur within the supply air heat exchanger, whereby water is introduced into the secondary air passages of the supply air heat exchanger.

In order to achieve heating using a vapour compression refrigeration circuit, the flow of the refrigerant is reversed such that the evaporator coil becomes the condenser coil, and the condenser coil becomes the evaporator, such that the exhaust air is now being heated, which in turn then heats the supply air. The warm exhaust air after heating the supply air is then passed through the evaporator coil (heating mode), and the use of warm air prevents frosting of the evaporator coil.

In considering the invention, several beneficial aspects will become apparent. For example, many air conditioning systems incorporate variable air volume flow control (VAV) in order to reduce energy consumption at times of low air conditioning demand. This involves in traditional systems, slowing the supply air and exhaust fans. Several unsatisfactory factors caused by VAV include poor distribution of air to occupants in the space, reduction in fresh air quantity, or if this fresh air quantity is maintained it becomes a larger proportion of the supply air than in the original design and equipment performance does not meet the design requirements.

The present invention overcomes these problems by enabling the exhaust air volume flow to be reduced (surplus supply air being exhausted separately through controlled outlets from the space) while supply air can be maintained at full flow or a flow which does not cause poor distribution. Clearly traditional systems which recycle air cannot achieve this. In addition the resulting pressurization of the conditioned space using this invention has the effect of minimizing infiltration of outside air.

In the example of the invention which uses desiccants for dehumidifying, as the dehumidifying process increases the air temperature proportionally to the removal of moisture, then the desiccation of exhaust air from the building is able to recover latent heat by dehumidification of the airstream. The increase in humidity within a building may occur through normal occupancy, or may result from actual humidification so as to improve comfort conditions within the building. Clearly, the use of desiccants for heating the exhaust air brings increased efficiency when the heat generated is added to the supply air through the primary supply heat exchanger which is in turn used to heat the occupied space.

Such a system would in practice be arranged to have the desiccant regenerated by heat energy which is stored for example in hot water or phase change chemicals which have received heat during periods of availability of sources such as solar or processed heat which are not continuously available and would otherwise go to waste.

The heating by desiccation obviously could make use of either solid or liquid desiccants, however there appear to be advantages for the preferential use of a liquid system over the solid system since the liquid desiccant can be more readily dried without the need for a large amount of additional equipment.

Since the processing of the primary supply air to the conditioned space is indirect and since the conditioning processes occur to the exhaust air, all modes of heating can be supplemented or boosted by direct burning of fuel (particularly gas) into the exhaust airstream after heat from other renewable or waste sources has been used to their full availability. The products of combustion of such fuel do not enter the supply air due to the indirect conditioning of the supply air. However, the total heat of the fuel is available for conditioning of the supply air.

Where the desiccation process is used for cooling, it requires the removal of sensible heat from the exhaust air before it is passed through the primary supply air heat exchanger. Preferably, this cooling process is carried out simultaneously as the air is desiccated, and in particularly humid climates, there may be a need for a further stage of cooling.

In the cooling process, the regeneration of the desiccant is carried out in the same manner as in the heating process. When the system s being used for cooling, obviously there will be a greater availability of solar energy and drying of the desiccant will be achieved more readily.

BRIEF DESCRIPTION OF THE DRAWINGS

Embodiments of the invention are described hereunder in some detail with reference to and are illustrated in the accompanying drawings in which.

DETAILED DESCRIPTION OF THE PREFERRED EMBODIMENTS

Figure 1:
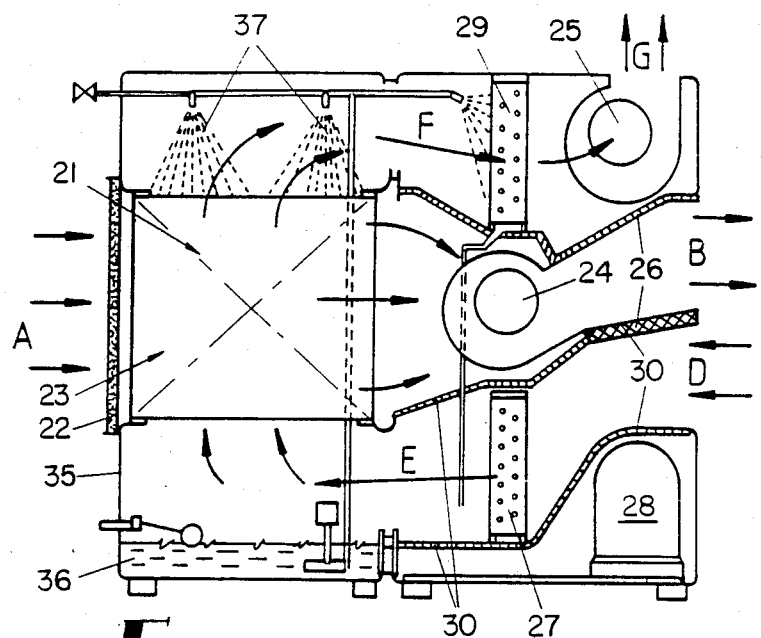
FIG. 1 is a partly diagrammatic elevational section through a very simple embodiment of the invention wherein an indirect supply air heat exchanger is coupled to a vapour compression type of refrigeration plant.

The letters A, B, C, D, E, F and G indicate positions on the diagrams of the typical air condition at those positions on the corresponding psychrometric charts. The first, second and fourth embodiments have psychrometric charts for a fuller understanding of the thermodynamics of the system.

Referring first to FIGS. 1, 2, 3 and 4, an indirect air conditioner for cooling a conditioned space 20 comprises a supply air heat exchanger 21 having a filter 22 at its intake end, and an array of plates 23 which divide the interior of the heat exchanger 21 into primary passages (extending horizontally) and secondary air passages (extending vertically).

A blower fan 24 comprises first impeller means for drawing air through the supply air heat exchanger 21, and delivering it to the conditioned space 20, and a second blower fan 25 functions to assist the withdrawal of exhaust air from the conditioned space 20 for final delivery to atmosphere as described hereunder.

Conduit walls 26 define an air flow path between the downstream side of the primary air passages of the supply air heat exchanger 21 and the conditioned space 20, and there is provided an exhaust air heat exchanger which in this embodiment is an evaporator coil 27 of a vapour compression type closed cycle refrigeration unit which comprises a compressor 28 and a condenser coil 29. In the installation envisaged for this embodiment, the compressor 28 is significantly reduced in size by comparison to the size of a compressor required for heating the same size conditioned space 20. The conduit walls 30 define an exhaust air flow path between the conditioned space 20 and the exhaust air heat exchanger 27, and from the evaporator coil 27 to the secondary air passages of the supply air heat exchanger 21.

Figure 2:
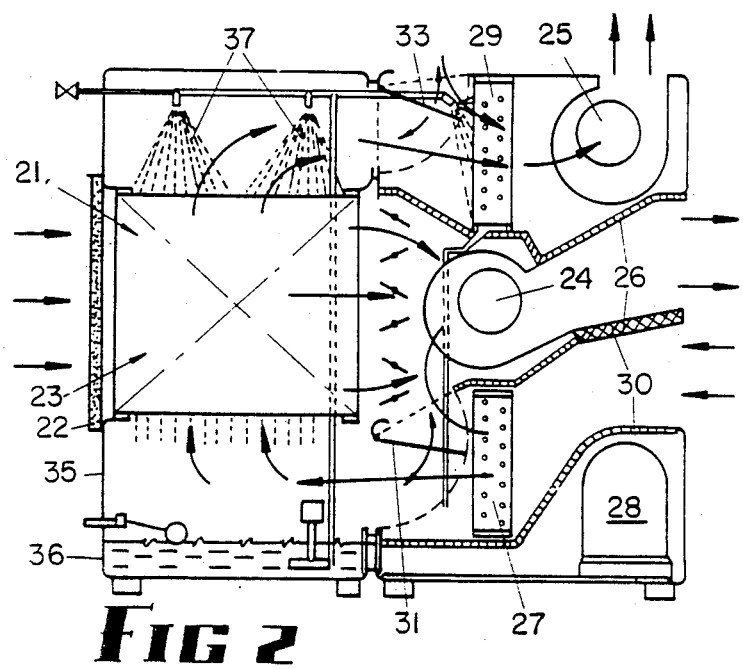
FIG. 2 is a drawing similar to FIG. 1 but showing facilities for partial recycling of conditioned air.

In FIG. 2, use is made of damper 31 which can be opened for recycling purposes, and damper 33 can be opened for providing additional air flow through the condenser coil 29 if that is required.

Figure 4:
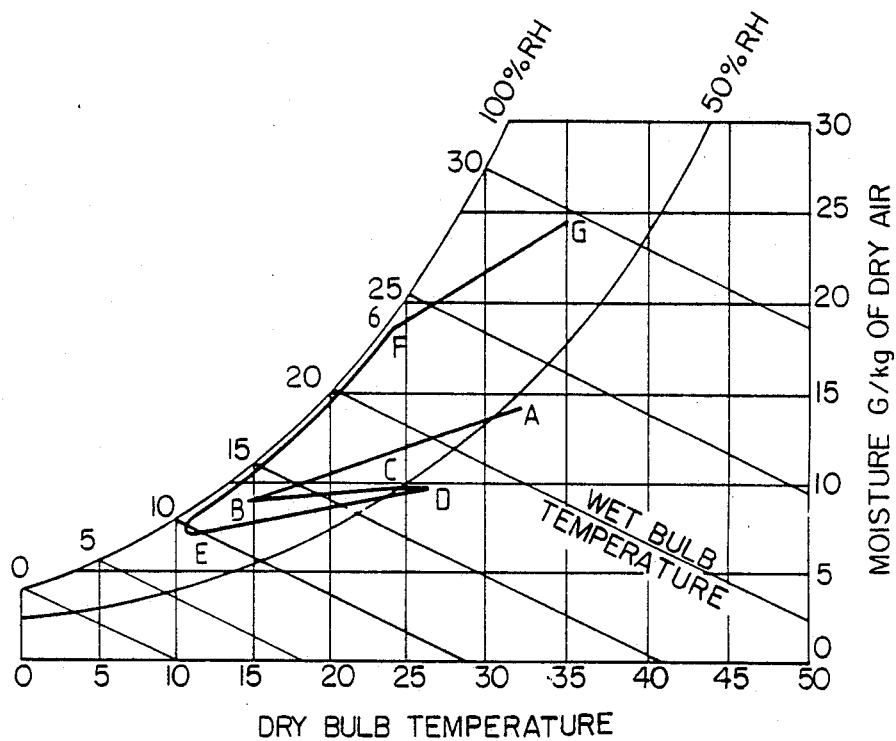
FIG. 4 is a psychrometric chart which shows the cooling mode operation of the first embodiment of FIG. 1.

Although it is possible that the invention can be used solely in a hating mode, as described below, the mode illustrate in FIGS. 1 and 2 and shown psychrometrically in FIG. 4 is a cooling mode, and in that mode the supply air heat exchanger 21 is contained within a cabinet 35 having a sump 36 and a series of sprays 37 which are arranged to spray water downwardly through the secondary air passages s as to cause evaporation of the exhaust air as it passes through the supply air heat exchanger 21.

Figure 3:
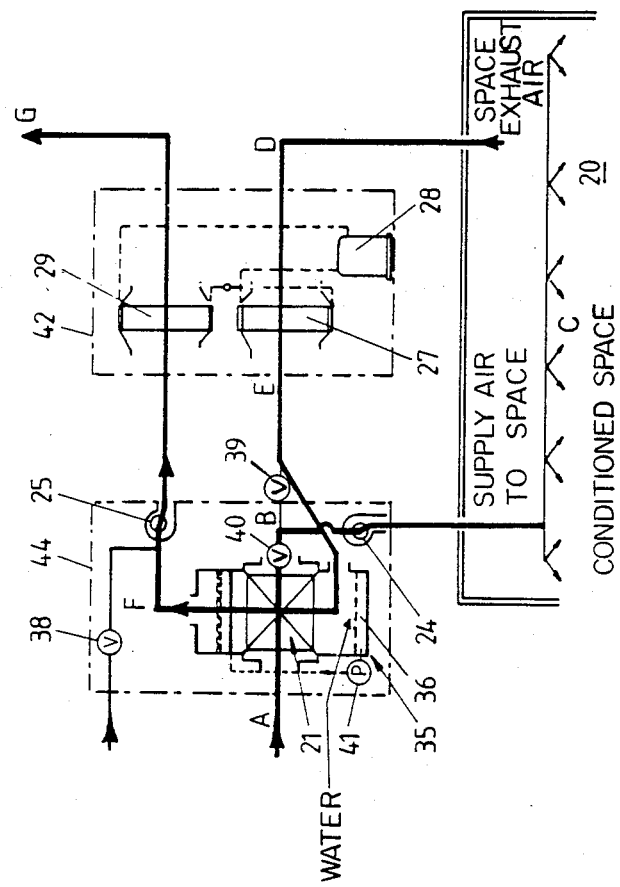
FIG. 3 is a diagrammatic representation of an installation utilising the equipment shown in FIGS. 1 and 2.

FIG. 3 illustrates the valves 38, 39, 40 and 41 which are operative to cause a flow of air reverse to that illustrated by the arrows, that is from point A into the conditioned space C, via point D wherein the evaporator and condenser coils 27 and 29 are interposed in a reverse cycle mode of the vapour compression unit 42, and in this instance the supply air passes over the coil 27 (then functioning as a condenser coil) for heating of that air, this being the only instance wherein the air entering the conditioned space 20 is directly processed.

Figure 5:
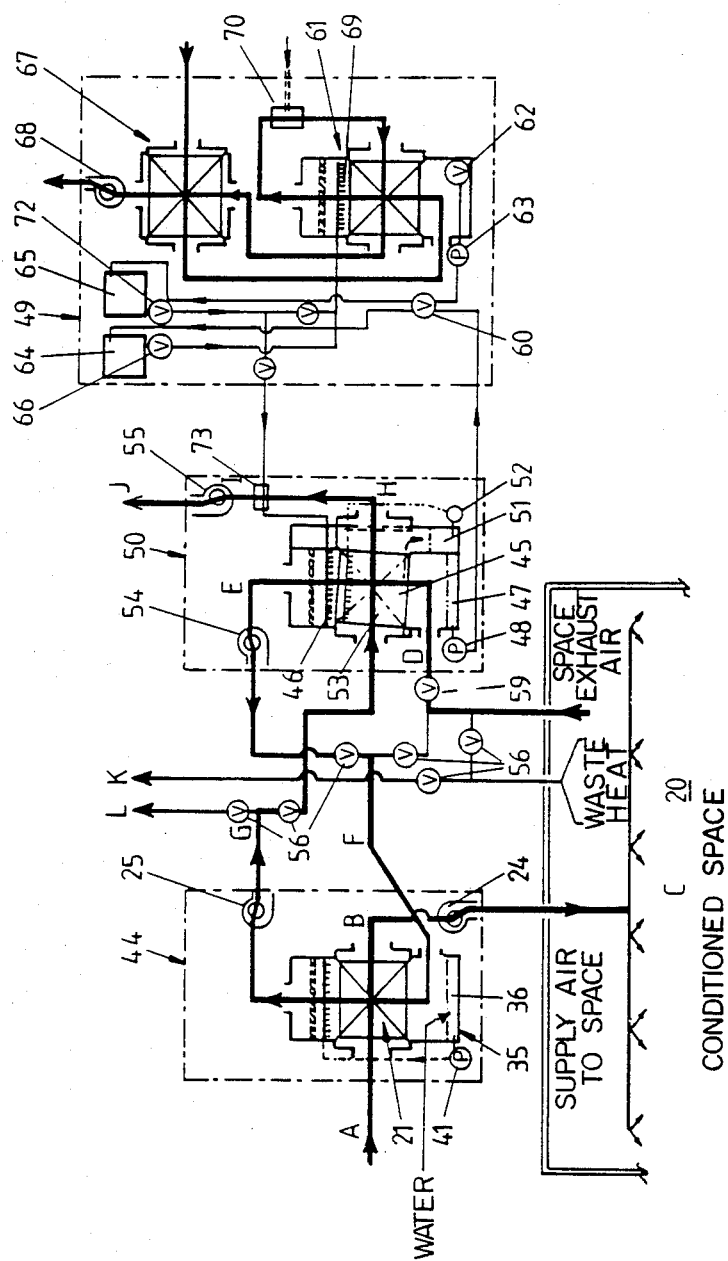
FIG. 5 is a diagrammatic representation showing an installation according to a second embodiment which avoids the use of vapour compression equipment of FIGS. 1 to 4, and utilizes in lieu thereof a liquid desiccant in a simple configuration of heat exchangers suitable for use in a temperate climate where low humidity is normally encountered.
Figure 6:
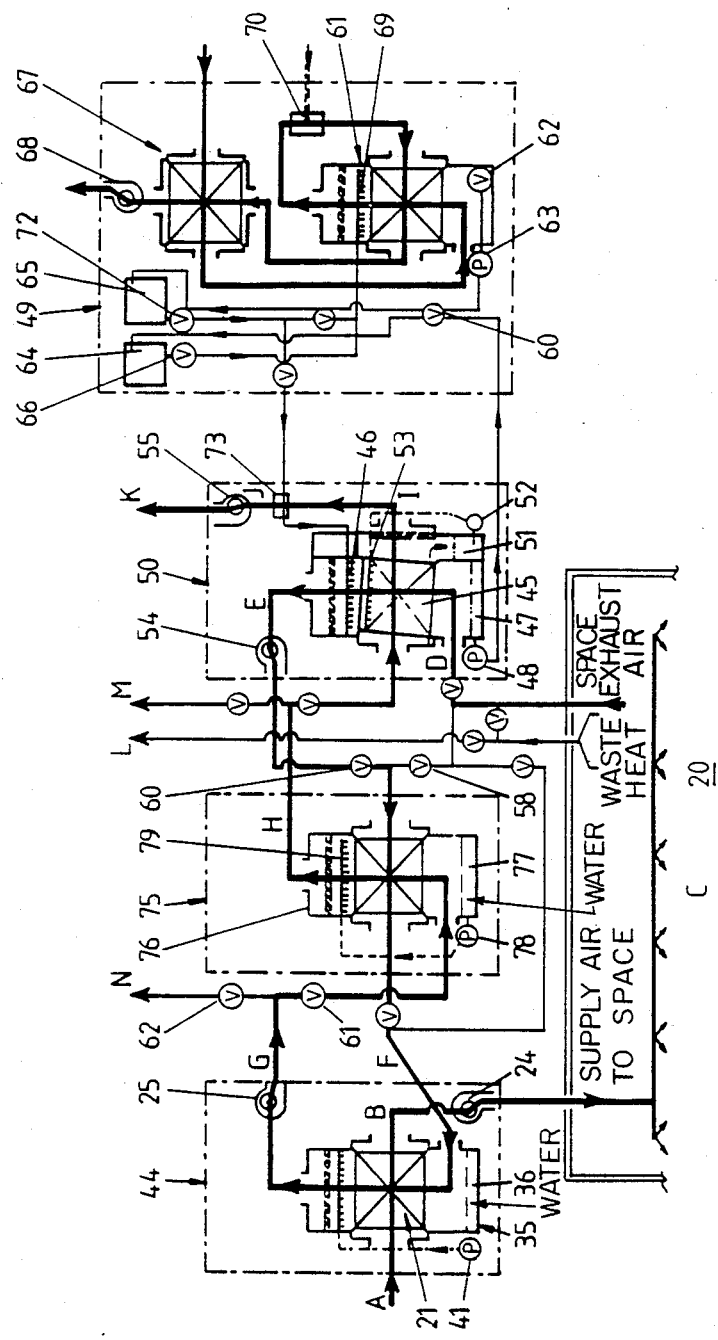
FIG. 6 is a drawing corresponding to FIG. 5 but showing an additional exhaust air heat exchanger required for assisting dehumidification in high humidity climates.
Figure 7:
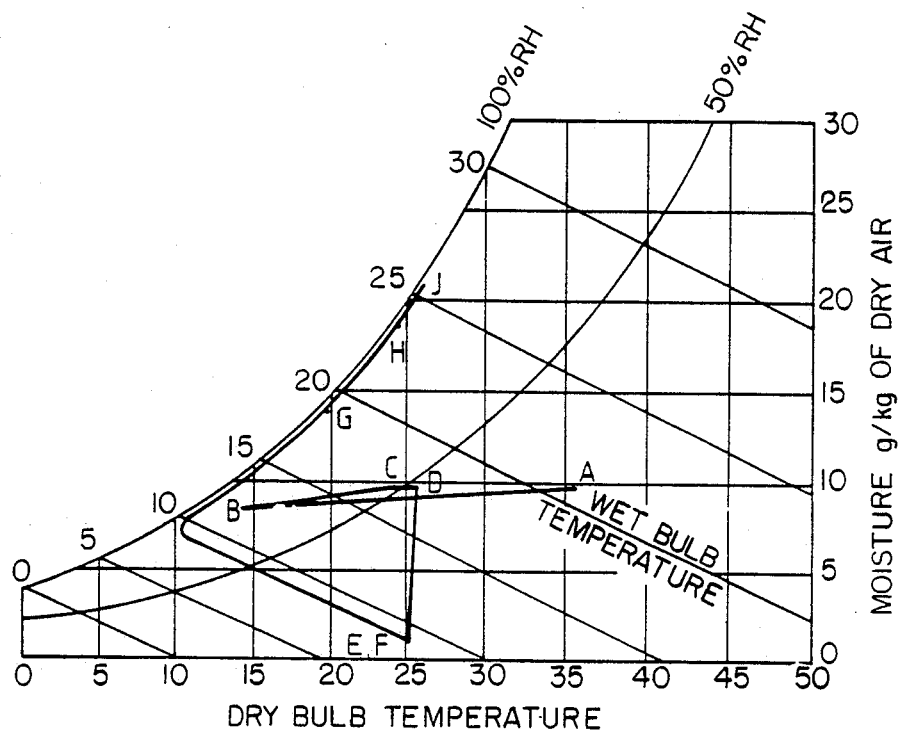
FIG. 7 is a psychrometric chart which illustrates the heating mode of FIGS. 5 and 6.

Reference is now made to a preferred embodiment for use in temperate climates, making use of liquid desiccant (lithium chloride or lithium bromide solution) in lieu of the vapour compression unit 42, for the exhaust air heat exchanger. This second embodiment is illustrated in FIGS. 5 and 6, FIG. 7 showing the heating mode and FIG. 8 the cooling mode in this embodiment. FIG. 5 is represented in a similar manner to FIG. 3. A conditioned space 20 is fed with fresh air by the blower fan 24 which draws the air through the primary air passages of the supply air heat exchanger 21, and the exhaust air is impelled by the blower fan 25.

Figure 8:
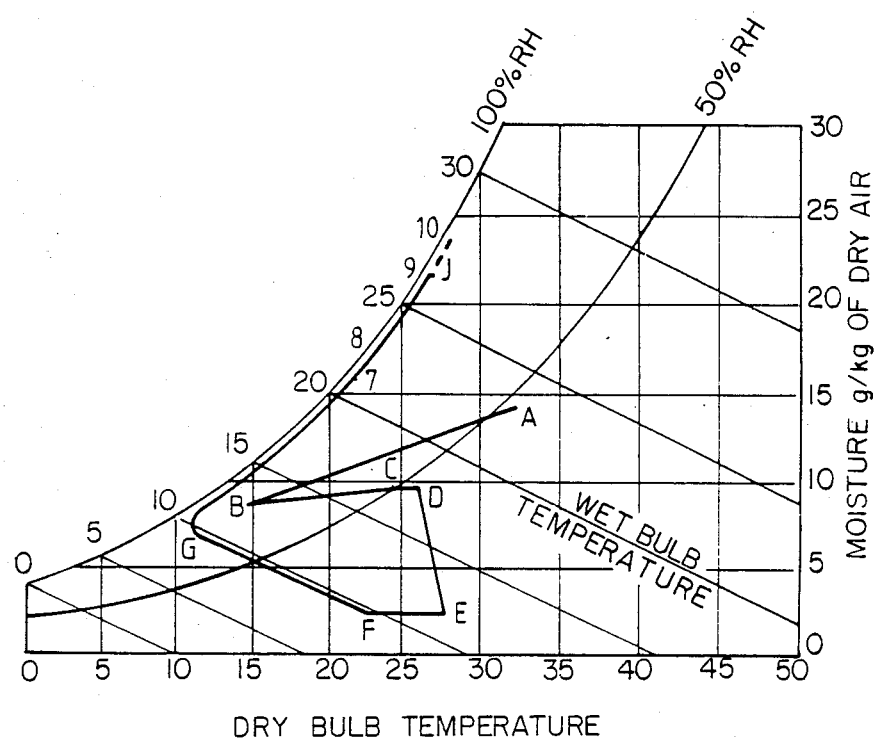
FIG. 8 is a psychrometric chart showing the cooling mode utilising the liquid desiccants of FIGS. 5 and 6.

As seen in the top right hand corner of conditioned space 20 on FIG. 5, exhaust air is first passed through an exhaust airheat exchanger 45 passing upwardly through primary air flow passages therein, and in those air flow passages the exhaust air comes into close contact with films of lithium chloride or lithium bromide solution directed downwardly into those passages through sprays 46, and collected in a sump 47 from which the then diluted desiccant solution is pumped by pump 48 to a desiccant regenerator module 49. The desiccant has the function of dehumidifying the air from the space 20, and such dehumidification is exothermic so that the air at point E in the exhaust air heat exchange module 50 is normally heated. However this is undesirable for a cooling cycle as illustrated in FIG. 8, and consequently the primary air flow passages of heat exchanger 45 are sprayed with water from sump 51 (alongside sump 47) by means of a pump 52 which pumps water through sprays 53. As seen in FIG. 8, this has the beneficial effect of causing the air to drop in humidity without substantial rise in temperature, moving from point D to point E on the psychrometric chart.

The cooled air which is now also very dry moves to the base of the cabinet 35 and passes upwardly through the secondary air flow passages of the supply air heat exchanger 21 where water is added so that it cools further before being impelled by the fan 25 back into the secondary passages of the exhaust air heat exchanger 45, from which it is finally exhausted to atmosphere at point J. Two blower fans 54 and 55 assist in achieving this movement of air.

The network of valves 56 provides an operator with a range of options by which he can control the heating mode wherein the heat exchange 45 has limited, or no cooling water flow.

The diluted desiccant is put into direct contact with an air flow, but it should be noted that the blower fans causing the air flow are of simple and inexpensive construction.

In many instances waste heat is readily available (for example from the stove of a restaurant). FIG. 5 illustrates how the valves 56 through to 62 enable the control and usage of waste heat, to control the flow of exhaust air through the exhaust air heat exchanger 45 (which sometimes is not required), so that there is more complete control over the functions of the air conditioner. The amount of water which is pumped by pump 52 can be varied in accordance with the cooling requirements of the exhaust air being reintroduced to the supply air heat exchanger secondary passages, and the desiccant pump 48 can also be controlled to control the degree of dehumidification, such controls being in accordance with known art and therefore not herein described. The same controls can be effective for heating of air in the exhaust air heat exchanger 45, air being heated by dehumidification unless the dehumidification is associated with the cooling of the water delivered from the sump 51 to the sprays 53 by the pump 52.

However in normal usage the lithium chloride or other liquid desiccant solution will be more diluted in the sump 47 than at the sprays 46, and it needs heating for regeneration. The pump 48 delivers the dilute desiccant solution firstly to a small heat exchanger 60 in the regenerator module 49 which preheats the liquid going to a concentrator 61 and cools liquid coming from the concentrator sump 62 driven by pump 63, and the two storage tanks 64 and 65 contain respectively the dilute and concentrated solutions.

The preheated desiccant in tank 64 is released into the concentrator 61 (which is a heat exchanger) by means of a valve 66 where it is subjected to heat from a heat source which may for example be gas introduced into the air stream and ignited, water heated by solar heating, or waste heat if otherwise available. It might be noted that the heat source need not have a very high temperature, and temperature of between 80° C. and 100° C. is normally satisfactory.

Scavenge air is introduced into the heat exchanger 67 by fan 68 (or a plurality of fans 68) where it is preheated before being delivered to a counterflow of liquid from tank 64 through sprays 69, passing out of the top of concentrator 61 and down through a further heating means 70 (for example to be gas heated) before passing counterflow through the secondary passages of the concentrator heat exchanger 61, in order to simultaneously heat the desiccant as it is concentrated. The out-going scavenge air then passes through the alternate secondary set of passages of the heat exchanger 67 before being discharged.

The concentrated desiccant solution from storage tank 65 is dispensed through valve 72 and a cooler 73 (cooled by the cold exhaust air being discharged from the heat exchange module 50).

The desiccant is most effective in dehumidification when it is cold because its function is to absorb moisture in accordance with the vapour pressure differences.

FIG. 6 is very similar to FIG. 5, with the difference that there is provided an intermediate heat exchange module 75 wherein the exhaust air is subjected to a further cooling stage between stages G and H by an intermediate heat exchanger 76 cooled from water in sump 77 driven by pump 78 to be discharged through sprays 79 as in the supply air heat exchanger 21.

Reference is made specifically to transition from point D to point E in FIG. 8, referred to above. Although not isothermal, this will be seen to be almost an isothermal traverse of the air during its desiccation. This is believed to be a unique feature of the cooling cycle using liquid desiccant.

Figure 9:
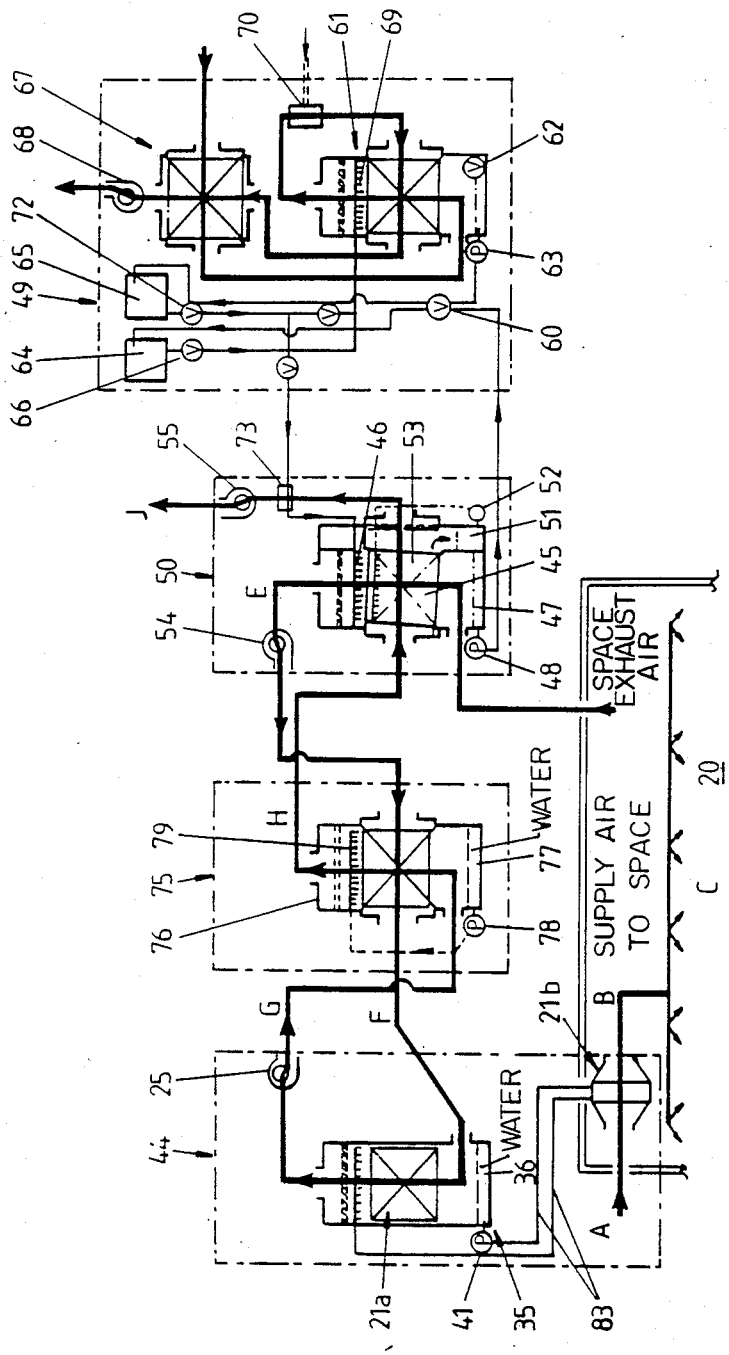
FIG. 9 is a diagram similar to FIG. 6 but showing in addition the use of a heat exchanger equivalent to a separate cooling tower for cooling of supply air.

The supply air eat exchanger 21 has been described heretofore as comprising a plurality of plates which separate the primary air passages from the secondary air passages. However the primary and secondary air passages need not necessarily be divided by plates, and can for example be comprised in two separate structures which are separated by water lines. The third embodiment of FIG. 9 is substantially similar to the embodiment of FIG. 6 and similar elements bear similar designations. However the supply air heat exchanger 21 is separated into two portions, 21a and 21b, and these are joined together by water lines 83. The water lines 83 transport water pumped by the primary sump of 21a through the portion 21b of the heat exchanger which contains the primary air passages. The secondary air passages in portion 21a extend only vertically, but the portion 21a wets the exhaust air as it passes from point F to point G as in FIGS. 5 and 6. This arrangement reduces ducting cost in certain installations.

Figure 10:
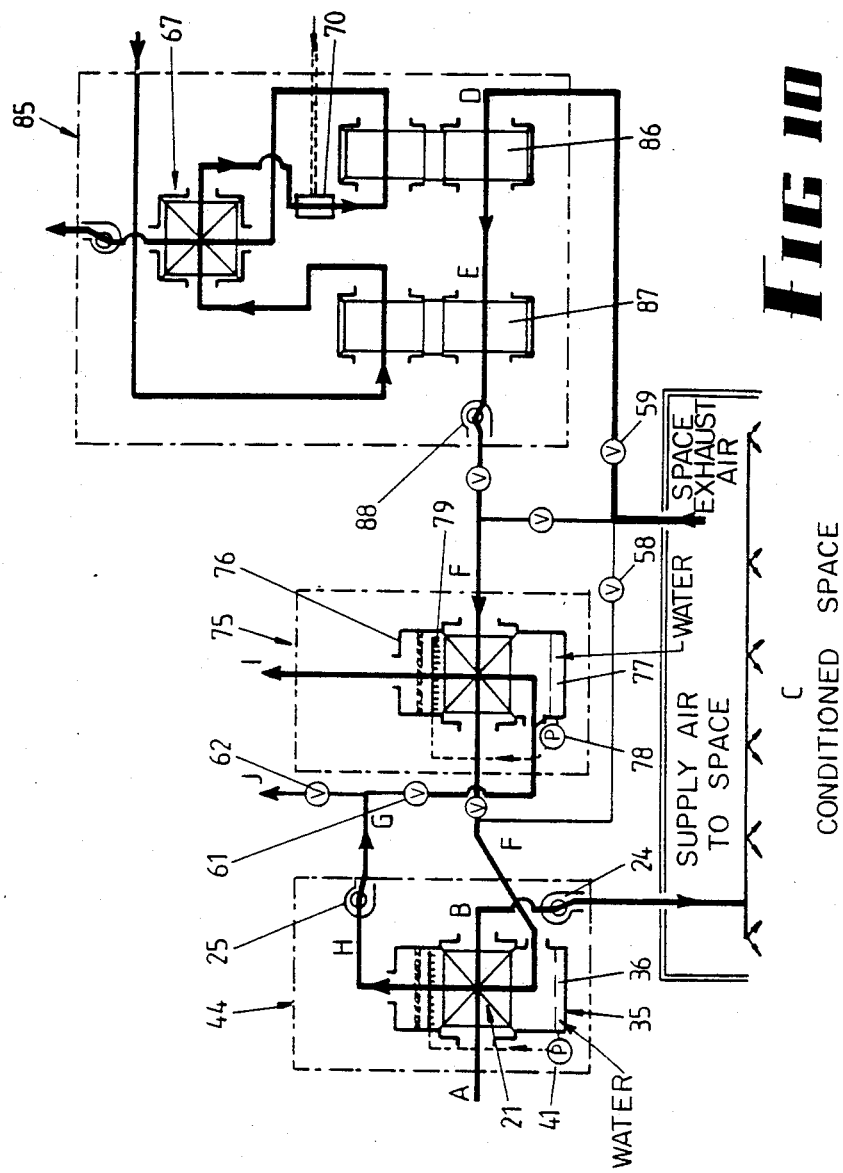
FIG. 10 is a diagram similar to FIG. 6 but showing the use of a solid desiccant instead of a liquid desiccant in a rotary wheel of known type.
Figure 11:
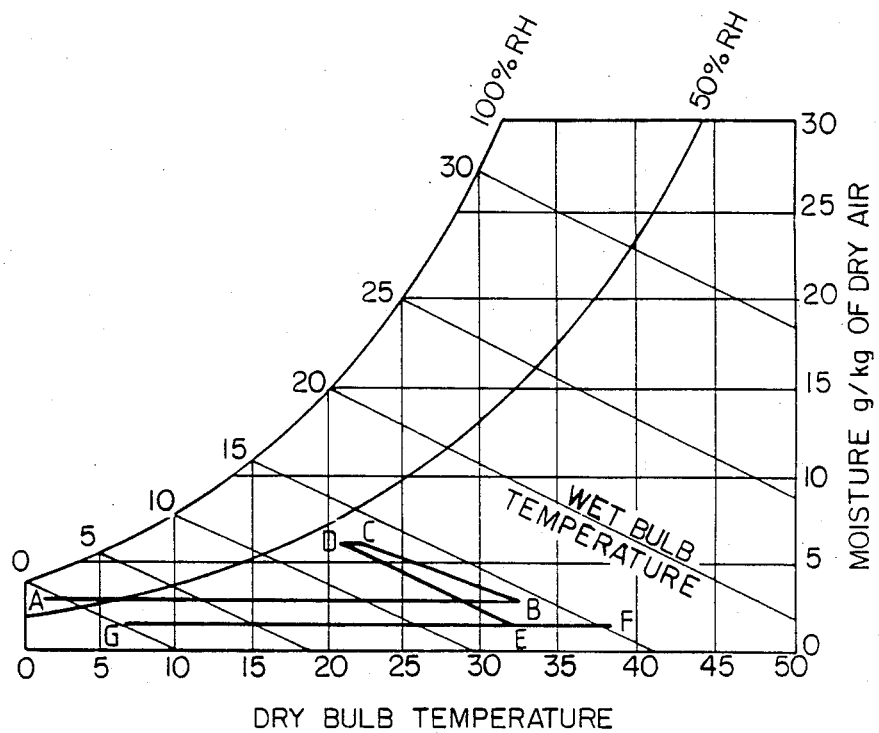
FIG. 11 is a psychrometric chart of the heating mode of the embodiment of FIG. 10.
Figure 12:
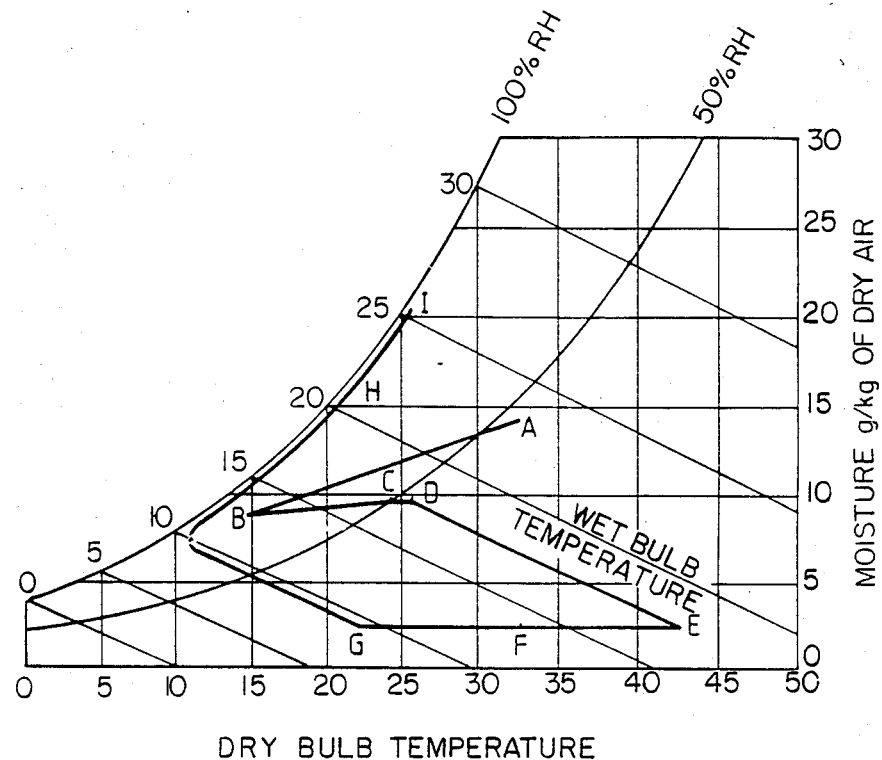
FIG. 12 is a psychrometric chart of the cooling mode of FIG. 10.

Reference is now made to the final embodiment of the specification illustrated in FIGS. 10, 11 and 12. In addition use can be made of the solid desiccant in a desiccant wheel, and this is illustrated in the final embodiment.

As for example in FIG. 6, the module 44 contains pump 41 which pumps water from sump 36 in cabinet 35 to water sprays which spray water through the secondary passages through which the exhaust air is passing. The heat exchange module 75 comprises an intermediate heat exchanger 76, and a pump 78 pumps water from sump 77 to be discharged through sprays 79. The solid desiccant module 85 is provided with a desiccant wheel 86 which is in accordance with known art, and the exhaust air passes through a segment of that wheel as it rotates, and from there through a heat exchange wheel 87 (also in accordance with known art) which performs a cooling function. The blower fan 88 assists in moving the exhaust air.

The scavenge air passes firstly through the lower wheel 88 in the upper part of its traverse, then through the heat exchanger 67 which functions as in FIGS. 5 and 6, through the heater 70 which also functions as in that earlier embodiment, and preheats the scavenge air as it passes between wheels 87 and 86. The cooling function is performed both by the heat exchange wheel 87 and the heat exchanger 75.

FIGS. 11 and 12 respectively show the thermodynamics at the marked points on FIG. 10 in psychrometric charts for the heating and cooling modes.

A consideration of the above embodiments indicate that the invention overcomes the extra energy consumption incurred by vapour compression type systems if they are required to supply significant quantities of outside air to conditioned spaces in order to reduce the toxicity and health hazards of conditioned spaces, and makes it feasible to supply as much as 100% fresh air without loss of the required control to condition that air to lie within a comfort zone.

Secondly, the arrangement of components can be made very convenient and will facilitate flexibility in system design and application, and fan energy requirements can be reduced.

Thirdly, the invention enables the use of dehumidification devices and materials such as desiccants by removing the potential for contamination of the airstream which is sometimes associated with such devices.

Further the invention can be used in such a way that it eliminates chlorofluorocarbon refrigerants.

Still further, the coefficient of performance can be improved over vapour compression type units.

Still further, the mass flow of air needing to be conditioned can be reduced and a consequential increase in efficiency can be achieved, and the problems of existing VAV systems can be overcome.

I claim:

1. An indirect air conditioner utilizing exhaust air from a conditioned space to condition supply air incoming to said space comprising:
    a supply air heat exchanger having primary air passages and secondary air passages extending therethrough for heat exchange between said primary and secondary air passages,
    means defining an intake air flow path between a downstream side of the primary air passages of the supply air heat exchanger and the conditioned space,
    an exhaust air heat exchanger having a heating mode of operation,
    further means defining an exhaust air flow path between the conditioned space, the exhaust air heat exchanger, and the secondary air passages of said supply air heat exchanger, and
    air flow imparting means,
    the heat exchanger passages, air flow paths, and conditioned space being in a circuit such that the air flow imparting means causes air flow from the atmosphere, through the primary group of supply air heat exchanger passages where it is indirectly heated and into the conditioned space, and said exhaust air flow from the conditioned space, through the exhaust air heat exchanger where it is heated, and through the secondary group of supply air passages where it effects said indirect heating of the air flow from the atmosphere before it discharges to atmosphere.

2. An indirect air conditioner according to claim 1 further comprising a refrigerator compressor, a condenser coil and an evaporator coil coupled together in a vapor compression refrigeration circuit wherein said condenser coil is said exhaust air heat exchanger.

3. An indirect air conditioner according to claim 1 wherein said exhaust air heat exchanger comprises air flow passages, said air flow imparting means causing flow of exhaust air to traverse first through air flow passages of the exhaust air heat exchanger and then through the secondary air flow passages of the supply air heat exchanger,
    and desiccant supply means which brings the exhaust air into intimate contact with desiccant during its said traverse through the air flow passages of the exhaust air heat exchanger.

4. An indirect air conditioner according to claim 1 for heating said conditioned space wherein said exhaust air heat exchanger comprises a dehumidifier.

5. An indirect air conditioner according to claim 4 wherein said dehumidifier comprises a means arranged to dispense liquid desiccant into the exhaust air flow.

6. An indirect air conditioner according to claim 4 wherein said dehumidifier comprises a rotary desiccant dehumidifier, through which said exhaust air flows.

7. An indirect air conditioner according to claim 1 wherein the air flow imparting means further comprises a pair of fans, the first fan causing supply air flow, and the second fan causing exhaust air flow, wherein the supply air flow rate may be reduced by reducing the second fan speed.

8. An indirect air conditioner utilizing exhaust air from a conditioned space to condition supply air incoming to said space comprising:
    a supply air heat exchanger having primary air passages and secondary air passages extending therethrough for heat exchange between said primary and secondary air passages, water supply means operable to introduce water into an exhaust air flow through the secondary air passages,
    means defining an intake air flow path between a downstream side of the primary air passages of the supply air heat exchanger and the conditioned space,
    an exhaust air heat exchanger comprising a dehumidifier, further means defining an exhaust air flow path between the conditioned space, the exhaust air heat exchanger, and the secondary air passages of said supply air heat exchanger, and air flow imparting means, the heat exchanger passages, air flow paths, conditioned space and said dehumidifier being in a circuit such that the air flow imparting means causes air flow from the atmosphere, through the primary group of heat exchanger passages where it is indirectly heated and into the conditioned space, and said flow of exhaust air from the conditioned space through the dehumidifier and through the secondary air group of passages where it is directly cooled by evaporation of water when directed into the secondary air passages of said supply air heat exchanger before it discharges to atmosphere.

9. An indirect air conditioner according to claim 8 wherein said dehumidifier comprises a means arranged to dispense liquid desiccant into the exhaust air flow.

10. An indirect air conditioner according to claim 8 wherein said dehumidifier comprises a rotary desiccant dehumidifier through which said exhaust air flows.

11. An indirect air conditioner according to claim 8 wherein said exhaust air heat exchanger has primary air passages and secondary air passages for heat exchange between said primary and secondary air passages, said exhaust air flowing from the conditioned space through the secondary air passages of said exhaust air heat exchanger, there further being means arranged to dispense liquid desiccant into the secondary air passages of said exhaust air heat exchanger so as to dehumidify the exhaust air, and a further conduit means between the downstream side of the secondary air passages of said supply air heat exchanger and the upstream side of the primary air passages, the downstream side of the primary air passages discharging to atmosphere.

12. An indirect air conditioner according to claim 11 further comprising an intermediate heat exchanger between said supply air and exhaust air heat exchanger, also having primary and secondary air passages for heat exchange between said primary and secondary air passages, a conduit extending from the downstream side of the secondary air passage of said exhaust air heat exchanger to the upstream side of the primary air passage of said intermediate heat exchanger, a conduit extending between the downstream side of the primary air passage of said intermediate heat exchanger to the upstream side of the secondary air passage of said supply air heat exchanger, a conduit extending from the downstream side of the secondary air passage of said primary heat exchanger to the upstream side of the secondary air passage of said intermediate heat exchanger, and a conduit extending from the downstream side of the secondary air passage of said intermediate heat exchanger to the downstream side of the primary air passage of said exhaust air heat exchanger, wherein means is provided to introduce water into the secondary air passages of said intermediate heat exchanger.

13. An indirect air conditioner according to claim 11 further comprising a liquid desiccant regenerator module comprising scavenge air heating means, a desiccant pump, a plurality of surfaces, desiccant dispensing means, and an air flow impeller, arranged in a configuration wherein said desiccant pump pumps liquid desiccant over the surfaces while air heated by the scavenge heating means traverses those surfaces and evaporates moisture from the desiccant.

14. An indirect air conditioner according to claim 13 further comprising a liquid desiccant heat exchanger wherein exhaust air from the downstream side of the primary air passages of said exhaust heat exchanger are passed through said liquid desiccant heat exchanger so as to cool the liquid desiccant.

15. An indirect air conditioner according to claim 8 wherein said dehumidifier comprises a rotary desiccant dehumidifier and there is provided an intermediate heat exchanger having primary and secondary air flow passages for heat exchange between said passages, and air conduit directing flow of air exhausted from the conditioned space through the rotary desiccant dehumidifier to dry the exhaust air, through the primary air group of passages of the intermediate heat exchanger to cool the dried air, into the secondary group of passages in the supply air heat exchanger and from those secondary passages into the secondary air group of passages in the intermediate heat exchanger before discharging to atmosphere, and further water supply means located to direct water into the secondary passages of the intermediate heat exchanger to thereby cool the exhaust air as it traverses the first group of passages thereof.

16. An indirect air conditioner utilizing exhaust air from a conditioned space to condition supply air incoming to said space comprising:

a supply air heat exchanger having primary air passages and secondary air passages extending therethrough for heat exchange between said primary and secondary air passages, water supply means operable to introduce water into an exhaust air flow through the second air passages, means defining an intake air flow path between a downstream side of the primary air passages of the supply air heat exchanger and the conditioned space, an exhaust air heat exchanger, further means defining an exhaust air flow path between the conditioned space, the exhaust air heat exchanger, and the secondary air passages of said supply air heat exchanger, air flow imparting means, a refrigerator compressor, a condenser coil and an evaporator coil coupled together in a vapor compression refrigeration circuit wherein said evaporator coil forms said exhaust air heat exchanger, and wherein the heat exchanger passages, air flow paths, conditioned space and evaporator coil are in a circuit such that the air flow imparting means causes air flow from the atmosphere, through the primary air passages of said supply air heat exchanger where it is indirectly cooled and into the conditioned space, and said flow of exhaust air from the conditioned space through the evaporator coil, and through the secondary air passages of said supply air heat exchanger where it is directly cooled by evaporation of water when directed into the secondary air passages of said supply air heat exchanger before it discharges to atmosphere.

17. An indirect air conditioner according to claim 16 wherein there is provided an air deflector within the upstream side of the secondary air passage of said supply air heat exchanger which i movable between a first position wherein all said exhaust air is directed through the secondary air passage of said supply air heat exchanger, and a second position wherein some of said exhaust air is directed to the downstream side of the primary air passage of said supply air heat exchanger for recycling in the conditioned space.

18. An indirect air conditioner according to claim 17 wherein said condenser coil is located in the downstream side of the secondary air passages of said supply air heat exchanger.

19. An indirect air conditioner according to claim 16 wherein said indirect air conditioner may be used also for heating said conditioned space, said refrigeration circuit being reversed such that said evaporator coil becomes a condenser coil and said condenser becomes an evaporator coil.

* * * * *